United States Patent
Theis et al.

(10) Patent No.: US 9,554,551 B2
(45) Date of Patent: Jan. 31, 2017

(54) CLEANING UNIT FOR CLEANING AT LEAST ONE HEAD SECTION OF A TEAT CUP

(75) Inventors: Christelle Theis, Iserlohn (DE); Bendikt Schürmann, Nottuln (DE)

(73) Assignee: GEA Farm Technologies GmbH, Bönen (DE)

( * ) Notice: Subject to any disclaimer, the term of this patent is extended or adjusted under 35 U.S.C. 154(b) by 816 days.

(21) Appl. No.: 13/126,932

(22) PCT Filed: Nov. 4, 2009

(86) PCT No.: PCT/EP2009/064637
§ 371 (c)(1),
(2), (4) Date: Jul. 25, 2011

(87) PCT Pub. No.: WO2010/052250
PCT Pub. Date: May 14, 2010

(65) Prior Publication Data
US 2011/0290285 A1    Dec. 1, 2011

(30) Foreign Application Priority Data

Nov. 10, 2008  (DE) .................. 10 2008 056 545

(51) Int. Cl.
A01J 7/02        (2006.01)
(52) U.S. Cl.
CPC ..................... *A01J 7/025* (2013.01)
(58) Field of Classification Search
CPC .............. A01J 7/02; A01J 7/04; A01J 7/025; A01J 5/08; B08B 9/20; B08B 9/00; B08B 13/069; B05B 1/14
USPC ...... 134/18, 166 R; 119/14.18, 14.08, 14.02, 119/651, 14.47, 14.04, 14.01, 673
See application file for complete search history.

(56) References Cited

U.S. PATENT DOCUMENTS

| 4,516,592 A | 5/1985 | Schultz et al. |
| 6,418,877 B1 | 7/2002 | Fredericks et al. |
| 6,796,272 B1* | 9/2004 | Chowdhury ............... 119/14.47 |
| 2007/0017449 A1* | 1/2007 | Holmes et al. ............ 119/14.52 |

FOREIGN PATENT DOCUMENTS

| AU | 564242 | 8/1987 |
| DE | 38942 | 5/1965 |
| DE | 4432754 | 3/1996 |
| DE | 102008056545.8 | 11/2008 |

(Continued)

OTHER PUBLICATIONS

Opposition and Statement of Grounds against European patent No. 2 362 724 mailed Feb. 6, 2015, corresponding to the present application.

(Continued)

*Primary Examiner* — Joseph L Perrin
*Assistant Examiner* — Irina Graf
(74) *Attorney, Agent, or Firm* — Smith Law Office; Jeffry W. Smith

(57) ABSTRACT

A cleaning unit for cleaning at least one head section of a teat cup including a chamber that has a substantially circular cross-section, is delimited by a wall and has an opening delimited by a sealing element. The chamber has at least one inlet and is characterized in that at least one section of the sealing element or at least one section of the wall adjoining the opening and a section of the sealing element is or are flexible around the circumference of the chamber.

18 Claims, 5 Drawing Sheets

(56) References Cited

FOREIGN PATENT DOCUMENTS

| EP | 0 535 754 A1 | 7/1993 | |
|---|---|---|---|
| EP | 0 990 387 A2 | 5/2000 | |
| EP | 2 362 724 B1 | 11/2009 | |
| WO | WO96/08137 | 3/1996 | |
| WO | WO03/077645 A1 * | 9/2003 | ................ A01J 7/02 |
| WO | WO2005/120217 A1 * | 12/2005 | ................ A01J 5/08 |
| WO | WO2010/052250 | 5/2010 | |

OTHER PUBLICATIONS

Patent Owner response to Opposition of EP Patent No. 2362724 filed Jul. 9, 2015, 4 pages.
GEA Farm Technologies GmbH's response to the Summons to Attend Oral Proceedings filed in the opposition of EP Patent No. 2362724, Aug. 4, 2016, 132 pages.
DeLaval's response to Summons to Attend Oral Proceedings filed in the opposition of EP Patent No. 2362724, Jul. 26, 2016, 2 pages.
EPO Preliminary Opinion of the opposition of EP Patent No. 2362724 and Summons to Attend Oral Proceedings, Feb. 23, 2016, 19 pages.

* cited by examiner

US 9,554,551 B2

1

CLEANING UNIT FOR CLEANING AT LEAST ONE HEAD SECTION OF A TEAT CUP

This application is a 371 U.S. National Entry of International Application: PCT/EP2009/064637, filed Nov. 4, 2009, which claims priority to German Application: 102008056545.8, filed Nov. 10, 2008, both of which are herein incorporated by reference in their entireties.

FIELD AND BACKGROUND OF THE INVENTION

The subject of the invention relates to a cleaning unit for cleaning at least one head section of a milking cup.

Raw milk represents an important food and is an important raw material for the food industry. In order to protect the consumer and for the purposes of technical processability, it is necessary that the milk meets both national and international quality requirements. In the Federal Republic of Germany, according to §3 of the Milk Regulations, raw milk must not have any abnormal sensory features so that, according to Annex 3 of the Milk Regulations, the udder of animals from which milk is obtained as a food must be cleaned at the start of a milking operation. Here, it is required that a thorough and complete cleaning takes place.

It is important to maintain prescribed standards of hygiene in order to ensure a high milk quality. It is therefore not only necessary to clean the udder and the teats of the animal but also the components of a milking machine. The cleaning can also include a disinfection of the components of the milking machine. The cleaning operation can be carried out by means of a fluid, in particular by means of water, with and without cleaning, disinfecting or other additives. In particular, it is necessary to clean and to disinfect the milking cluster of milk residues. It is not necessary for a disinfection of the milking cluster to take place during every cleaning operation.

The cleaning operation can take place after each milking operation or after a certain number of milking operations.

It is known that, after milking each cow, the milking cluster is cleaned by means of water, a disinfection solution and again water in combination with compressed air. This is a so-called intermediate disinfection.

It is not only necessary that the milk-conveying parts of the milking machine, in particular of a milking cluster, are cleaned. To ensure the quality of the milk, it is, if appropriate, also necessary to clean the outer surface of the milking cups, in particular of the head section of the milking cups. The head section comprises a region which has parts of a teat rubber. The cleaning of the outer part of the teat rubber, in particular of the region of the teat rubber which spans a milking cup sleeve, is particularly expedient when the teat rubber, or generally speaking the shaped teat tube, is made of silicone. The teat rubber can be formed from rubber or other materials. In the case of teat silicone, it is necessary, owing to the greater fat take-up of silicone, also to clean the outer region of the teat silicone head.

For the purpose of cleaning milking cups, different embodiments of a cleaning unit are known. WO 96/08137 discloses a cleaning unit for cleaning at least one head section of a milking cup, comprising a chamber which is substantially circular in cross section. The chamber is delimited by a double-walled wall. The chamber has an opening which is delimited by a sealing element. Adjacent to the sealing element are provided outlet openings through which a liquid conveyed in the double-walled wall can flow into the chamber. The liquid flows along the outer surface of the head section into the milking cup, thereby cleaning the head section and the inner part of the milking cup and also the parts connected to the milking cup.

A problem of such a configuration of the cleaning unit is that the introduction of the head section of the milking cup into the chamber is associated with a considerable expenditure of force. The reason for this is that the sealing element must ensure a fluid-tight connection between the sealing element and the head section in order to avoid vacuum losses.

Document DD 38 942 discloses a cleaning unit for cleaning at least one head section of a milking cup. The cleaning unit has a chamber which is delimited by a wall. The shape of the chamber is substantially in the form of a spherical cap. Sealing between the wall of the chamber and the head section of the milking cup takes place in that the head section is brought to bear against the inner surface of the wall of the chamber. In such a configuration of the cleaning unit, although the end face of the head section of the milking cup is cleaned, the lateral surface of the head section is not, which is particularly disadvantageous when the head section has an inner groove.

SUMMARY OF THE INVENTION

Taking this as the starting point, the objective on which the present invention is based is to develop the known cleaning unit for cleaning at least one head section of a milking cup in such a way that the handling operation for carrying out cleaning is simplified.

This object is achieved according to the invention by a cleaning unit for cleaning at least one head section of a milking cup having the features of claim 1. Advantageous developments and refinements of the cleaning unit form the subject of the dependent claims.

The cleaning unit according to the invention for cleaning at least one head section of a milking cup, comprising a chamber which is substantially circular in cross section and is delimited by a wall, with an opening which is delimited by a sealing element, wherein the chamber has at least one inlet, is distinguished in that at least one section of the sealing element or at least one section of the wall adjacent to the opening and a section of the sealing element is or are designed to be elastic substantially in the circumferential direction of the chamber.

The design according to the invention of the cleaning unit significantly simplifies handling. In particular, the expenditure of force which is required to introduce the head section of the milking cup into the chamber is correspondingly smaller than is the case with cleaning units according to the prior art. The removal of the milking cup from the chamber is also simplified. On the other hand, the design of the cleaning unit ensures that a sufficiently high degree of sealing is achieved between the milking cup and the sealing element in order to avoid vacuum loss.

The cleaning unit according to the invention for cleaning at least one head section also has the advantage that at least the removal of the milking cup can be automated. After carrying out cleaning of the milking cup, this cup can be removed from the chamber by means of an appropriate device and brought into a standby position.

Depending on the milking cluster to be used, a corresponding number of cleaning units can be provided at a milking stall. If, for example, the milking stall in question is one intended for the milking of cows, then four cleaning units are provided. The four cleaning units can form a common structural unit, with the result that the milking cups of the milking cluster can be cleaned simultaneously.

The elasticity of the sealing element or of the wall section adjacent to the opening and of the sealing element is preferably obtained in that the wall section is substantially corrugated in cross section. This makes it possible for the wall section to be stretched. This stretching allows a simplified introduction of the head section of the milking cup into the chamber. When the wall section contracts, the sealing element comes to bear against the head section of the milking cup.

To obtain yet a further improvement in the insertion or the withdrawal of the milking cup from the chamber, it is proposed according to yet a further advantageous refinement of the cleaning unit that a plurality of wall sections which are preferably arranged equidistant to one another are provided.

To simplify the production of the cleaning unit, it is proposed according to yet a further advantageous refinement of the cleaning unit that the wall section extends over the entire circumference of the chamber. This also ensures a uniform stretching, with the result that the opening cross section of the opening is correspondingly enlarged.

The cleaning at least of a head section of the milking cup takes place in such a way that the chamber is filled via an inlet with a cleaning liquid, preferably with water. If the head section is situated in the milking cup, it is advantageous for it to be arranged at a distance from the bottom of the chamber in order to allow a simplified cleaning of the head section, in particular of the end face of the head section. For this purpose, the chamber has a bottom which is provided with spacers. By means of the spacers it is also possible to positively influence the flow of the cleaning agent in the chamber. Preference is given to a design of the spacers in which these are substantially web-shaped. The spacers preferably extend from the longitudinal axis of the chamber radially outward. As a result, the flow of the cleaning agent into the milking cup is also influenced in an advantageous manner.

According to yet a further advantageous refinement of the cleaning unit, it is proposed that the wall has ribs which extend at least partially in the axial direction of the chamber.

The ribs ensure that the head section of the milking cup is spaced from the wall such that liquid can correspondingly flow and a cleaning of the outer side of the head section is achieved.

The ribs also have the advantage that the wall achieves a higher mechanical stability without the elastic stretchability in the circumferential direction being substantially compromised. By means of the ribs or the increased stability of the wall provided by the ribs, it is ensured that when negative pressure prevails in the chamber, the wall is not deformed in the direction of the head section of the milking cup, or only to a very slight degree, and does not come to bear against the outer side of the head section of the milking cup.

A preferred design here is one in which the ribs are provided on the side of the wall facing the chamber. Some ribs can also be mounted on the outer side of the wall, these ribs making it possible to increase the stability of the wall still further.

If the ribs and the spacers lie in one plane, they can form flow channels within the chamber.

According to yet another advantageous refinement of the cleaning unit according to the invention, it is proposed that, as viewed in the axial direction, the wall has at least two regions. The region adjacent to the opening has a smaller wall thickness than the at least one further region. As a result, the elasticity of the region is changed such that the force necessary for inserting or for withdrawing the milking cup can be correspondingly reduced without influencing the sealing of the cleaning unit in conjunction with a milking cup.

The axial extensions of the regions are preferably.

To increase the stability of the cleaning unit, in particular in order to avoid the chamber being deformed while a vacuum is applied, it is proposed that at least one reinforcement which extends at least partially in the circumferential direction is provided in the transition region between two adjacent regions.

The cleaning unit according to the invention is preferably produced from one material, in particular from rubber. The chamber of the cleaning unit is preferably formed in one piece.

According to an advantageous development of the cleaning unit, it is proposed that the chamber has two regions, wherein the regions are formed from different materials. Thus, the region which, as viewed in the circumferential direction, is designed to be at least partially elastic can be produced from an elastic material, whereas the other region is produced from a material of greater hardness. This is preferably a material with lower elastic or non-elastic properties. In such a configuration, the chamber is preferably produced by the two-component injection-moulding process.

According to yet another advantageous refinement of the cleaning unit according to the invention, it is proposed that at least the region adjacent to the opening has a Shore hardness between 50 and 70, preferably of 60.

According to yet another advantageous refinement of the cleaning unit according to the invention, it is proposed that a substantially rotationally symmetrical element which preferably projects from the chamber is provided substantially concentrically to the longitudinal axis of the chamber. The element is dimensioned such that it projects into the teat rubber. By virtue of the element, the milking cup is held in a predetermined position during cleaning.

According to an advantageous refinement of the cleaning unit, it is proposed that the element has at least one outlet which is connected to the inlet.

In a particularly preferred refinement of the cleaning unit, the element has at least one first and at least one second outlet which, as viewed in the axial direction, are arranged at a distance from one another such that, if a head section of a milking cup is arranged in the chamber, the element projects into the milking cup, wherein the at least one outlet is below the end face of the milking cup and the at least one second outlet is in the milking cup.

This refinement of the cleaning unit ensures that a portion of the cleaning agent flows through the first outlet into the chamber. A cleaning liquid passes through the second outlet into the milking cup, with the result that clean cleaning liquid is introduced into the milking cup.

The first outlet and the second outlet can be supplied with a cleaning liquid via separate channels, wherein a controller can be provided which controls corresponding means, preferably valves, in such a way that the cleaning liquid can be passed with a time offset into the chamber or into the element.

A corresponding control can also ensure that the main part of the liquid can pass through the second outlet into the milking cup.

A vacuum is applied in the milking cup during the cleaning operation, with the result that the cleaning liquid is sucked out of the chamber. The cleaning liquid is not fed in continuously, but intermittently with the interposition of aeration, with the result that a cleaning liquid and air are alternately passed through the outlets.

To improve the flow of the cleaning liquid into the milking cup or into the teat rubber, it is proposed that the element has at least one groove which extends in the longitudinal direction of the element. A liquid can be guided along this groove.

According to yet a further advantageous refinement of the cleaning unit, it is proposed that the element has a substantially conical free end section. As a result, the positioning of the milking cup is simplified. On the other hand, the design of the free end section results in a swirling motion of the cleaning liquid in the teat rubber, thereby improving cleaning of the teat rubber in the milking cup.

According to yet another advantageous refinement of the cleaning unit according to the invention, it is proposed that the free section has a number of channels which corresponds to the number of grooves, which channels communicate in terms of flow with the grooves, with the result that a portion of the liquid can also flow through the substantially conical free end section.

Further details and advantages of the cleaning unit according to the invention will be explained with reference to the exemplary embodiment illustrated in the drawing, without the subject of the invention being limited to this concrete exemplary embodiment.

DETAILED DESCRIPTION OF THE DRAWINGS

Figure 1:
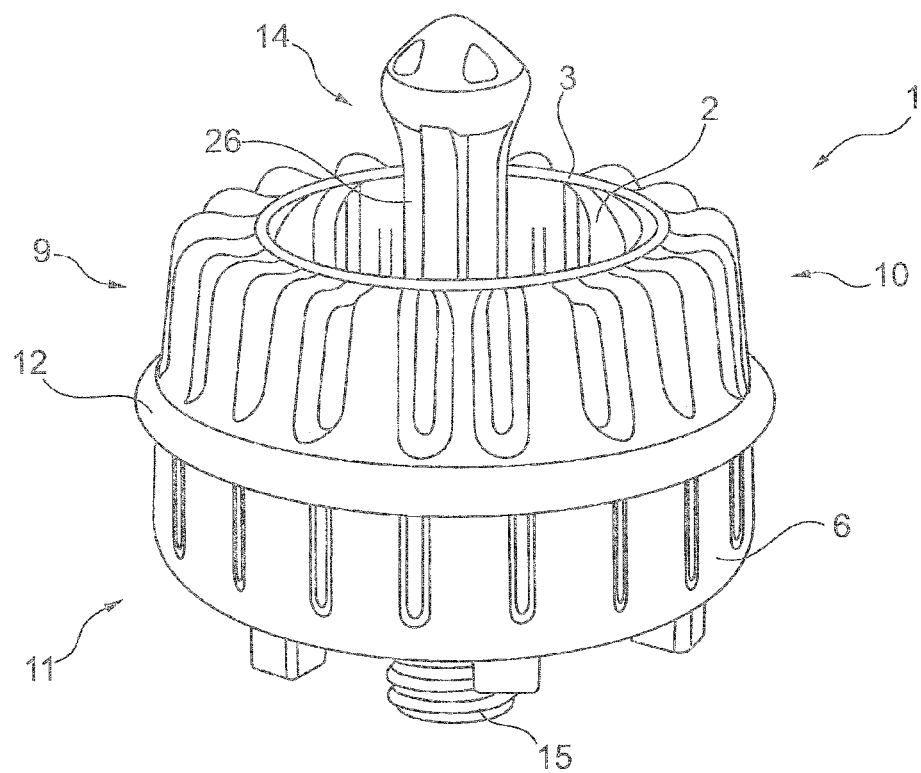
FIG. 1 shows a cleaning unit in a perspective view.

FIG. 1 shows schematically in a perspective view an exemplary embodiment of a cleaning unit 1 according to the invention for cleaning at least one head section of a milking cup.

The cleaning unit 1 has a substantially circular chamber 4 which is delimited by a wall 6. The chamber has an opening 2 which is delimited by a sealing element 3.

The cleaning unit 1 is produced in one piece from rubber or an elastic material.

The cleaning unit 1 has a wall section 9 which, as can be seen from the representation according to FIG. 1, is substantially corrugated in cross section. As viewed in the circumferential direction of the chamber, the wall section 9 extends over the entire circumference.

Figure 2:
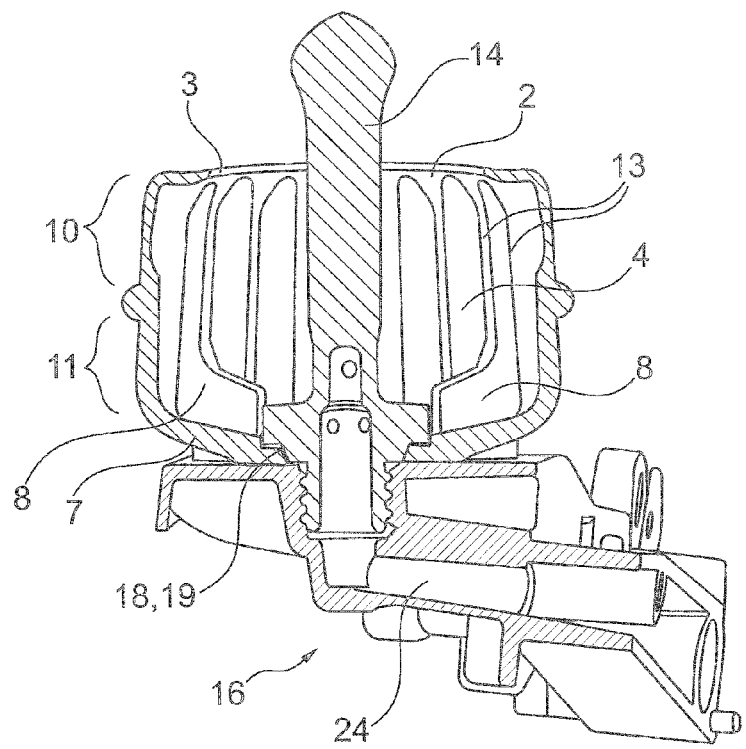
FIG. 2 shows the cleaning unit according to FIG. 1 in section in conjunction with a carrier unit.

The sealing element 3 is formed in one piece with the wall section 9 and has a radial extension of about 2.5 mm. As can be seen in particular from FIG. 2, the sealing element 3 is directed obliquely upward.

The wall 6 of the chamber has two regions 10, 11 which have a different wall thickness. The region 10 adjacent to the sealing element 3 has a smaller wall thickness than the further region 11 of the wall 6. The axial extension of the regions 10, 11 is preferably identical. It can be seen from FIGS. 1 and 2 that, as viewed in the circumferential direction, a reinforcement 12 which is of bead-like design is provided between the regions 10, 11.

Opposite the opening 2 is provided a bottom 7. Spacers 8 are formed on the bottom 7. The spacers 8 are substantially web-shaped. The spacers 8 preferably extend radially inward from the inner side of the wall 6.

Ribs 13 which extend at least partially in the axial direction of the chamber 4 are formed on the inner side of the wall 6.

A rotationally symmetrical element 14 is arranged substantially concentrically to the longitudinal axis of the chamber 4. The element 14 projects from the chamber 4 of the cleaning unit 1.

Figure 3:
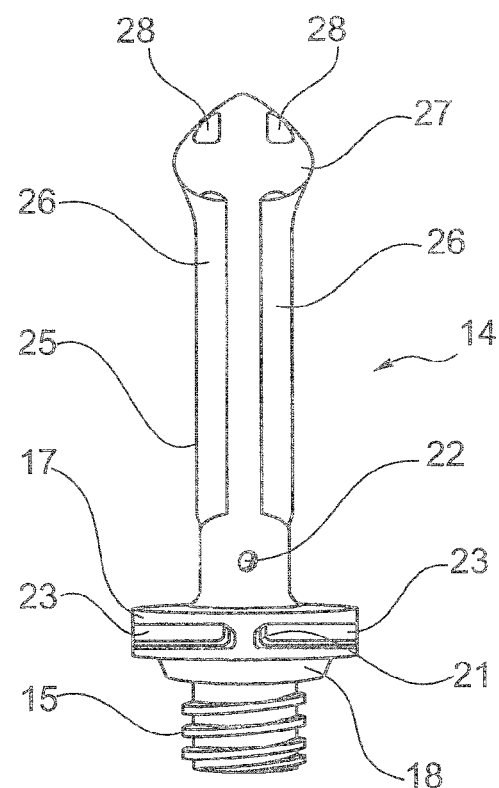
FIG. 3 shows an element in a front view.
Figure 4:
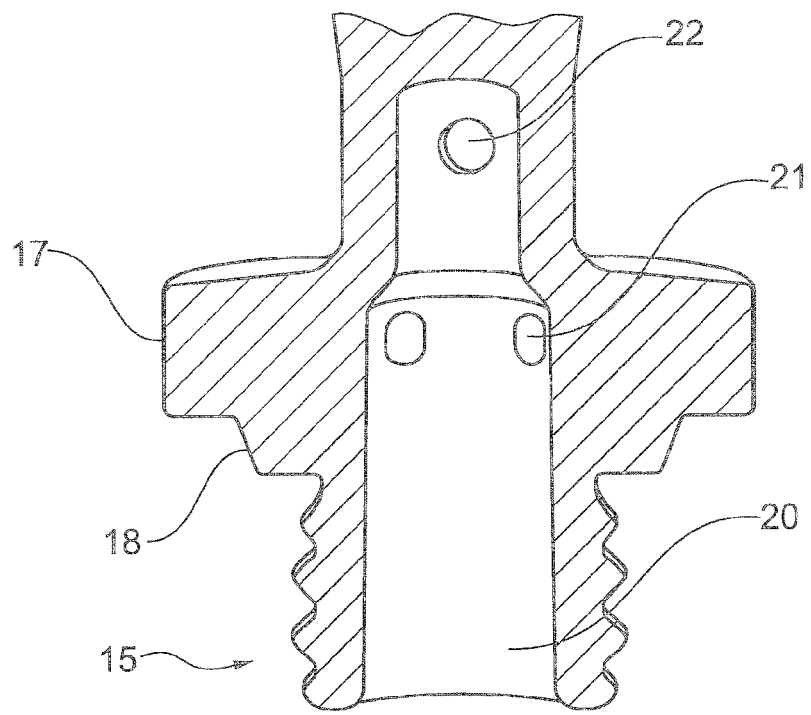
FIG. 4 shows, on an enlarged scale and in section, an end region of the element according to FIG. 3.

The element 14 is represented in FIG. 3. It has a connection region 15 which, in the exemplary embodiment represented, takes the form of a thread. The connection region 15 projects from the cleaning unit 1 and serves for connection with a carrier unit 16. The carrier unit 16 has a corresponding internal thread for receiving the thread of the connection region 15. Above the connection region 15 is provided a collar 17 which comes to bear against the bottom 7 in the mounted state. The collar 17 has a bevel 18 which interacts with a correspondingly formed bevel 19 in an opening in the bottom 7. The bevel 18 and the corresponding opposing bevel 19 in the bottom 7 ensure that the cleaning unit 1 is centered on the carrier unit 16.

A channel 20 is provided inside the element 14. The channel 20 extends partially in the longitudinal direction of the element 14. The channel 20 has a first outlet 21 and a second outlet 22. The first and the second outlets are at a distance from one another as viewed in the axial direction. In the exemplary embodiment represented, the first outlet 21 is formed by four outlet openings which lead into corresponding pockets 23 of the collar 17.

The channel 20 of the element 14 is connected to a feedline 24 which is formed in the carrier unit 16. If a cleaning liquid flows through the feedline 24 into the channel 20 of the element 14, the liquid leaves the element through the first outlet 21 and the second outlet 22 and passes both into the inside and the outside of the teat rubber which is situated in the milking cup. Further details are explained further below.

A milking cup comprises a milking cup sleeve and a teat rubber arranged therein. The term teat rubber should be interpreted essentially in a functional sense. Consequently, there is no restriction to a teat rubber made of the material rubber. The teat rubber can also be produced from silicone or other materials. A head region of the teat rubber engages around the milking cup sleeve, with the result that this head region is situated outside the milking cup sleeve. Where mention is made below of the cleaning of the milking cup, this is also intended to include the cleaning of the teat rubber.

Figure 5:
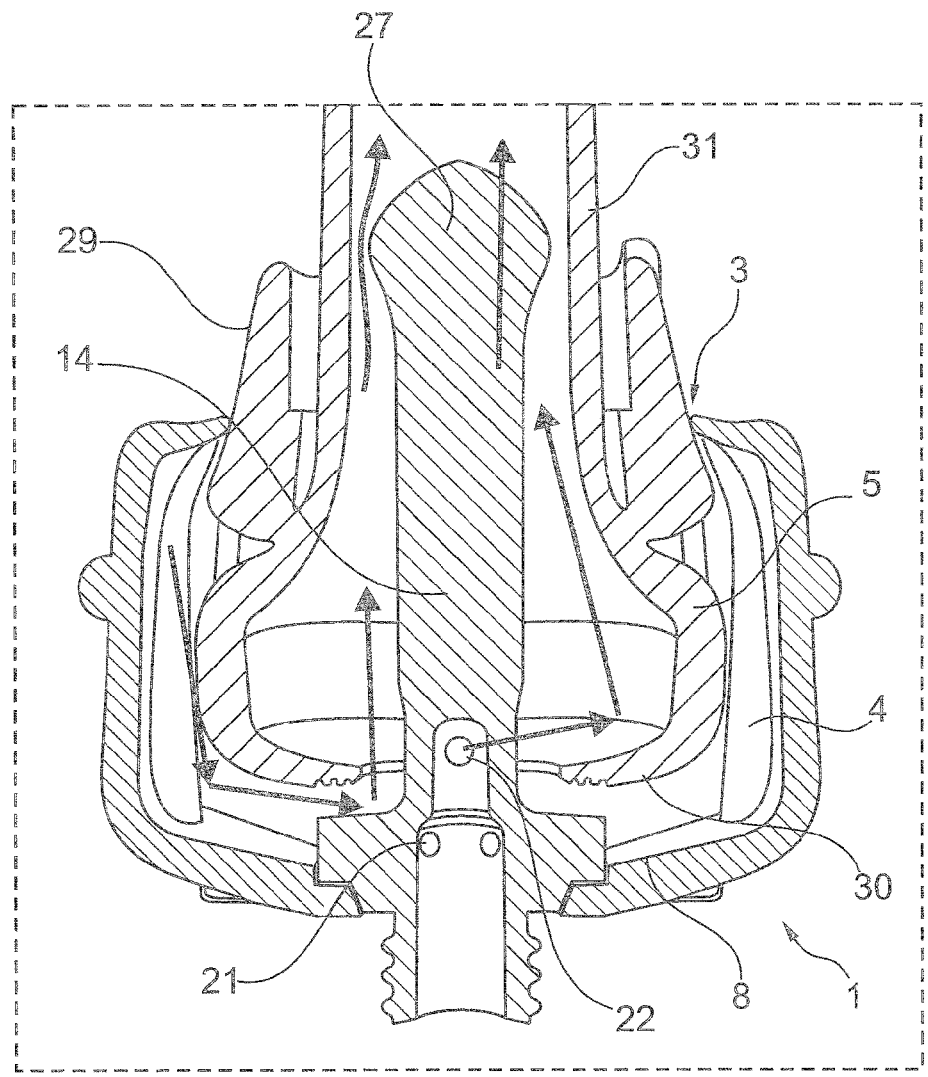
FIG. 5 shows the cleaning unit according to FIG. 1 in a sectional view with a teat rubber.

The flow of the cleaning liquid out of the element 14 is schematically represented in FIG. 5.

The element 14 has a shank 25. Grooves 26 are provided in the longitudinal direction of the shank. The free end region 27 of the element 14 is substantially conical. The free end section 27 of the shank 25 has channels 28. The channels 28 extend in the longitudinal direction of the shank 25 and communicate with the grooves 26.

To carry out a cleaning operation on a head section 5 of a teat rubber, the head section 5 of the teat rubber is positioned in the cleaning unit 1, as can be seen from FIG. 5. The fact that the element 14 projects from the chamber 4 of the cleaning unit 1 and has a substantially conical end section 27 means that the milking cup is positioned when the head section 5 is inserted into the chamber. During the cleaning operation, the element 14 supports the position of the milking cup.

When inserting the head section 5 of the milking cup, the wall region of the cleaning unit is stretched in the circumferential direction, which is also the case for the sealing element 3, thereby facilitating the insertion of the head section 5. The sealing element 3 comes to bear against a collar 29 of the teat rubber. The end face 30 of the head section 5 of the teat rubber rests on the spacers 8. An annular gap between which the cleaning agent can pass is present between the inner side of the wall 6 and the outer face of the head section 5.

To clean the head section 5, a cleaning agent, in particular water, is passed via the feedline 24 into the channel 20. The cleaning agent leaves the channel 20 through the first outlet 21 and the second outlet 22. The cleaning agent leaving the first outlet 21 fills the chamber 4 with the cleaning agent. The cleaning agent level rises in the chamber 4 until the latter is preferably virtually completely filled. A portion of the cleaning agent fed through the channel 20 leaves the channel 20 through the outlet 22 and passes directly into the teat rubber 31.

The cleaning agent situated in the chamber 4 is sucked into the teat rubber 31 as a result of the vacuum which prevails in the teat rubber during the cleaning process. The flow paths are schematically represented by arrows.

In order to achieve a quick removal of the cleaning agent from the teat rubber 31, the grooves 26 and the channels 28 are provided. A portion of the cleaning agent flows around the substantially conical end section 27 of the element 14, while a portion of the liquid flows along the grooves 26 through the channel 20 into the shank region of the teat rubber 31.

The fact that the cleaning agent is introduced into the chamber and sucked out of it ensures that the outer side of the head section 5 of the teat rubber is cleaned.

Figure 6:
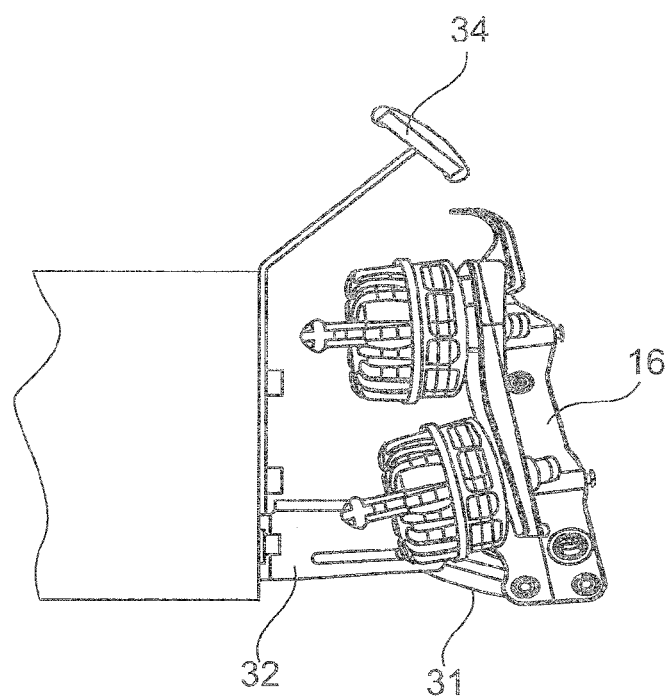
FIG. 6 shows a first exemplary embodiment of the arrangement of a plurality of cleaning units at the milking stall.
Figure 7:
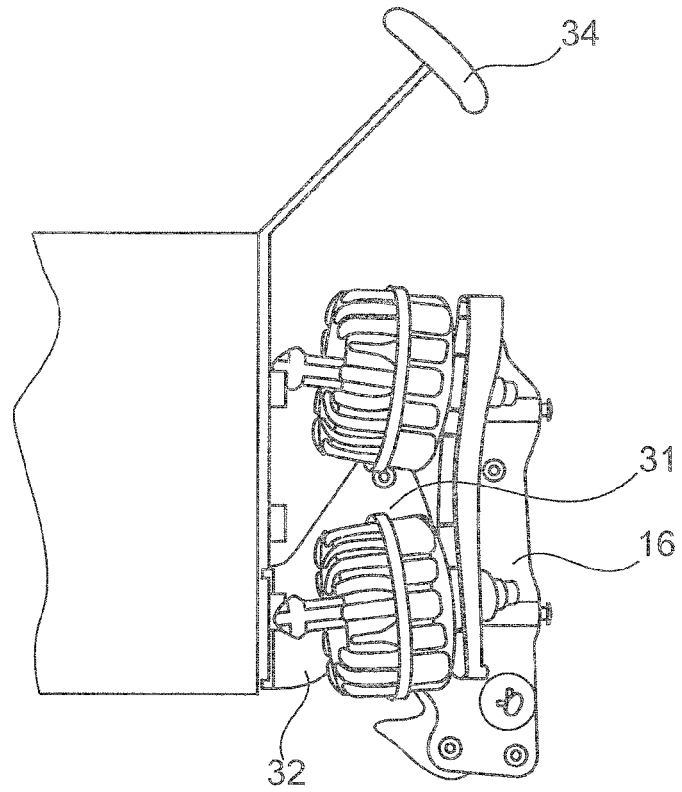
FIG. 7 shows a second exemplary embodiment of the arrangement of a plurality of milking units at the milking stall.
Figure 8:
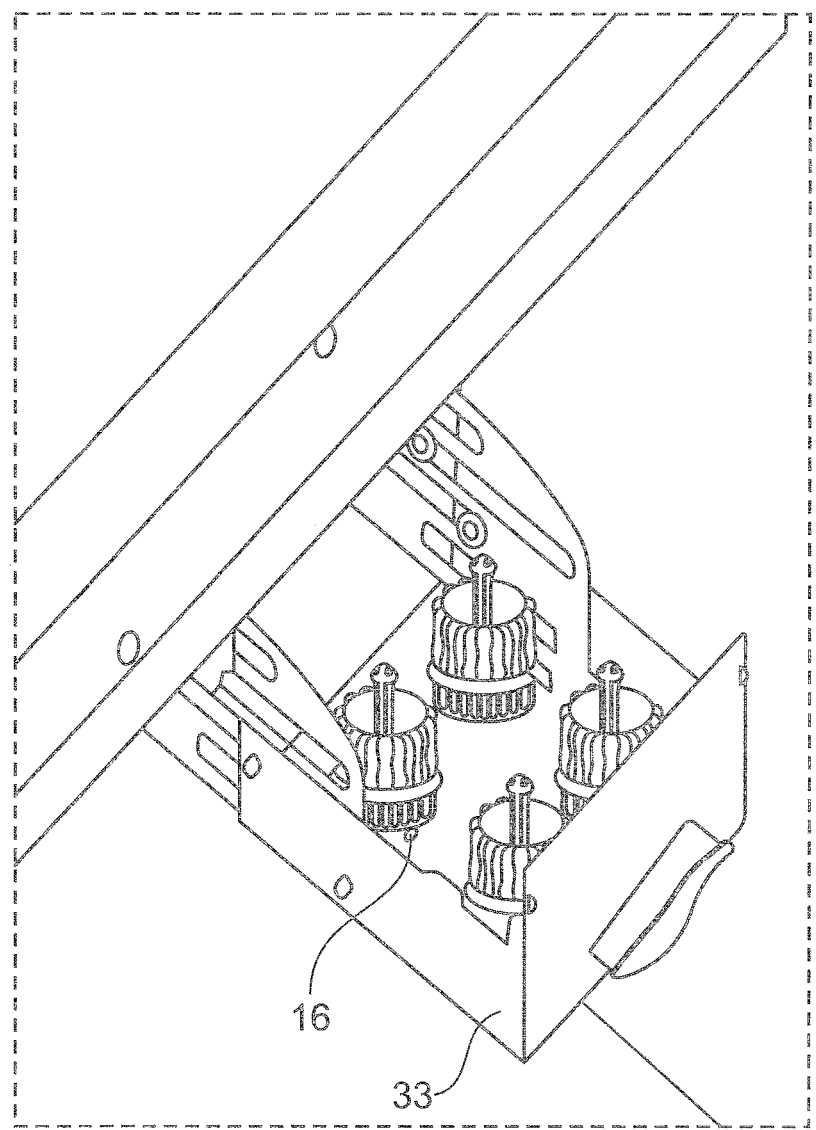
FIG. 8 shows a third exemplary embodiment of the arrangement of a plurality of cleaning units at the milking stall.

FIGS. 6 to 8 show different arrangements of cleaning units 1 at the milking parlor.

FIGS. 6 to 8 show four cleaning units which are each arranged on a carrier unit 16. The four cleaning units serve for cleaning milking clusters which are intended for the milking of cows.

FIG. 6 shows an arrangement in which the carrier unit 16 is connected in an articulated manner via an arm 31 to a carrier arm 32. By pivoting the carrier unit 16, the carrier unit 16 can be brought into the working position, in which the milking cups, which are not shown, are introduced into the cleaning units.

The carrier arm 32 is fastened to a side wall of a milking parlor, which is not shown further.

A holder 34 is provided for holding a milking claw.

FIG. 7 shows a more compact design of the arrangement of cleaning units which are arranged on a carrier unit 16. The carrier unit 16 is connected via an arm 31 to a carrier arm 32 which is connected to a wall of a milking parlor. The carrier arm and the holding arm are connected to one another in an articulated manner. This also applies to the holding arm and the carrier unit 16. By means of a corresponding movement it is possible for the carrier arm, the holding arm and the carrier unit to be brought into a substantially horizontal position.

FIG. 8 shows an arrangement of four cleaning units which are secured to a carrier unit 16. The carrier unit 16 is arranged in a drawer 33 which is arranged in the region of the milking parlor.

The cleaning unit can also be arranged directly on a cleaning line. The number of cleaning units is dependent on the number of milking clusters to be cleaned. In the case of a milking parlor for goats, two cleaning units can be provided, for example.

LIST OF REFERENCE SIGNS

1 Cleaning element
2 Opening
3 Sealing element
4 Chamber
5 Head section
6 Wall
7 Bottom
8 Spacer
9 Wall section
10/11 Region
12 Reinforcement
13 Rib
14 Element
15 Connection region
16 Carrier unit
17 Collar
18/19 Bevel
20 Channel
21 First outlet
22 Second outlet
23 Pocket
24 Feedline
25 Shank
26 Groove
27 End section
28 Channel
29 Collar
30 End face
21 Arm
32 Carrier arm
33 Drawer

The invention claimed is:

1. A cleaning unit for cleaning at least one head section of a milking cup, the cleaning unit comprising;
    a wall having a corrugated wall section defining an opening and at least partially defining a chamber with a substantially circular cross section;
    a sealing element at least partially defining the opening in the wall section;
    wherein the chamber has a bottom with a plurality of spacers and at least one inlet for a cleaning liquid, and a section of the sealing element is elastic in the circumferential direction of the chamber, and wherein the corrugated wall section and the sealing element are deformable to receive at least a portion of a teat rubber head section so that a bottom end face of the teat rubber head section rests on the plurality of spacers; and
    an element projecting from the bottom of the chamber and disposed substantially concentrically to a longitudinal axis of the chamber, wherein the element has a channel extending in a longitudinal direction inside the element and in fluid communication with the inlet, a first outlet and a second outlet axially spaced apart from one another and in fluid communication with the channel, so that the chamber can receive at least a portion of the teat rubber head section and the element is configured to project at least partially into the teat rubber head section, and wherein the first outlet of the element is situated below the bottom end face of the teat rubber head section and configured to eject the cleaning liquid toward an exterior surface of the teat rubber head section, and the second outlet of the element is positioned above the bottom end face of the teat rubber head section and configured to eject the cleaning liquid toward the inner surface of the teat rubber head section when the bottom end face of the teat rubber head section rests on the plurality of spacers.

2. The cleaning unit of claim 1, wherein the corrugated wall section extends around a circumference of the chamber to at least partially define cleaning fluid flow channels in the exterior surface cleaning space.

3. The cleaning unit of claim 1, wherein the spacers are substantially planar.

4. The cleaning unit of claim 1, wherein the wall includes a plurality of ribs, and each rib extends at least partially in an axial direction of the chamber.

5. The cleaning unit as claimed in claim 4, wherein at least one of the ribs is provided in a side of the wall facing the chamber.

6. The cleaning unit of claim 4, wherein at least one spacer and at least one rib lies in at least one axial plane.

7. The cleaning unit of claim 1, wherein the wall has a first region adjacent to the opening and the first region has a wall thickness that is thinner than a wall thickness of a second region that is spaced apart from the opening.

8. The cleaning unit of claim 7, wherein a ratio of the axial dimensions of the first region and the second region is about one.

9. The cleaning unit of claim 7, and further comprising;
at least one reinforcement extending at least partially in a circumferential direction in a transition region between the first region and the second region.

10. The cleaning unit of claim 7, wherein the first region is formed from different material than the material of the second region.

11. The cleaning unit of claim 10, wherein the first and second regions are produced by the two-component injection-molding process.

12. The cleaning unit of claim 7, wherein the first region has a Shore hardness between about 50 and about 70.

13. The cleaning unit of claim 7, wherein the first region has a Shore hardness of about 60.

14. The cleaning unit of claim 1 wherein the element is substantially rotationally symmetrical.

15. The cleaning unit of claim 1, wherein the element comprises a collar bearing against the bottom of the chamber having a pocket in communication with the chamber and the first outlet is in fluid communication with the pocket.

16. The cleaning unit of claim 1, wherein the element defines at least one groove extending in a longitudinal direction of the element.

17. The cleaning unit of claim 1, wherein the element has a free end section that is substantially conical in shape and unattached to the wall.

18. The cleaning unit of claim 17, wherein the element defines a longitudinal groove and the free end section comprises a longitudinal end channel in fluid communication with the longitudinal groove.

* * * * *